March 9, 1954   R. LARAQUE   2,671,703
SEAL-RING

Filed July 20, 1949   2 Sheets-Sheet 1

Inventor:
R. Laraque
By E. F. Wandsmith
Atty.

Patented Mar. 9, 1954

2,671,703

UNITED STATES PATENT OFFICE 2,671,703

SEAL RING

Roland Laraque, Paris, France, assignor to L'Auxiliaire Industrielle, Paris, France, a corporation of France Application July 20, 1949, Serial No. 105,762

Claims priority, application France April 25, 1949

6 Claims. (Cl. 309—3)

The present invention relates to improvements in seal-rings, and more particularly to an improved seal-ring more particularly adapted to be fitted between a cylinder liner and a cylinder.

An object of the present invention is to provide an improved seal-ring adapted for use whenever a perfect seal must be provided between two stationary parts affording substantially coaxial cylindrical faces, adapted to be placed in opposite relation, as for instance a cylinder member and a liner member therefor.

In such a case, said seal-ring is adapted to finally engage the liner member and the cylinder member respectively to provide a water-tight connection between these members.

A further object of the invention is to provide an improved seal-ring, for the purpose specified, which is simple to manufacture, easily set in place and removed when required.

The seal-ring is in the form of a U-shaped radially split ring having a convex outer surface which is adapted to be inserted in a peripheral recess in one of the members with the legs of the U extending inwardly and, in accordance with the invention, the width of the recess is slightly greater than the width of the U-shaped ring and the diameter of the ring with its ends abutting one another is slightly greater than the diameter of the other part, whereby when the one member is being inserted within the other the legs of the U are forced apart and bear rightly against the lateral sides of the recess.

Other objects of my invention will appear as the description proceeds.

A seal-ring for cylinder-liner according to my invention comprises an annular ring provided with a radial slot, said ring being U-shaped in cross-section and the legs of the U extending towards the center of said ring, the outer periphery of said ring being convex whereby said legs are caused to be displaced away from each other when the liner is forced in the cylinder block and said legs are tightly applied at the free edges thereof against the related vertical sides of circular grooves provided in said liner for receiving the said rings.

My invention will be best understood from the following description of a preferred embodiment thereof, taken in connection with the annexed sheet of drawings, wherein.

Figure 1:
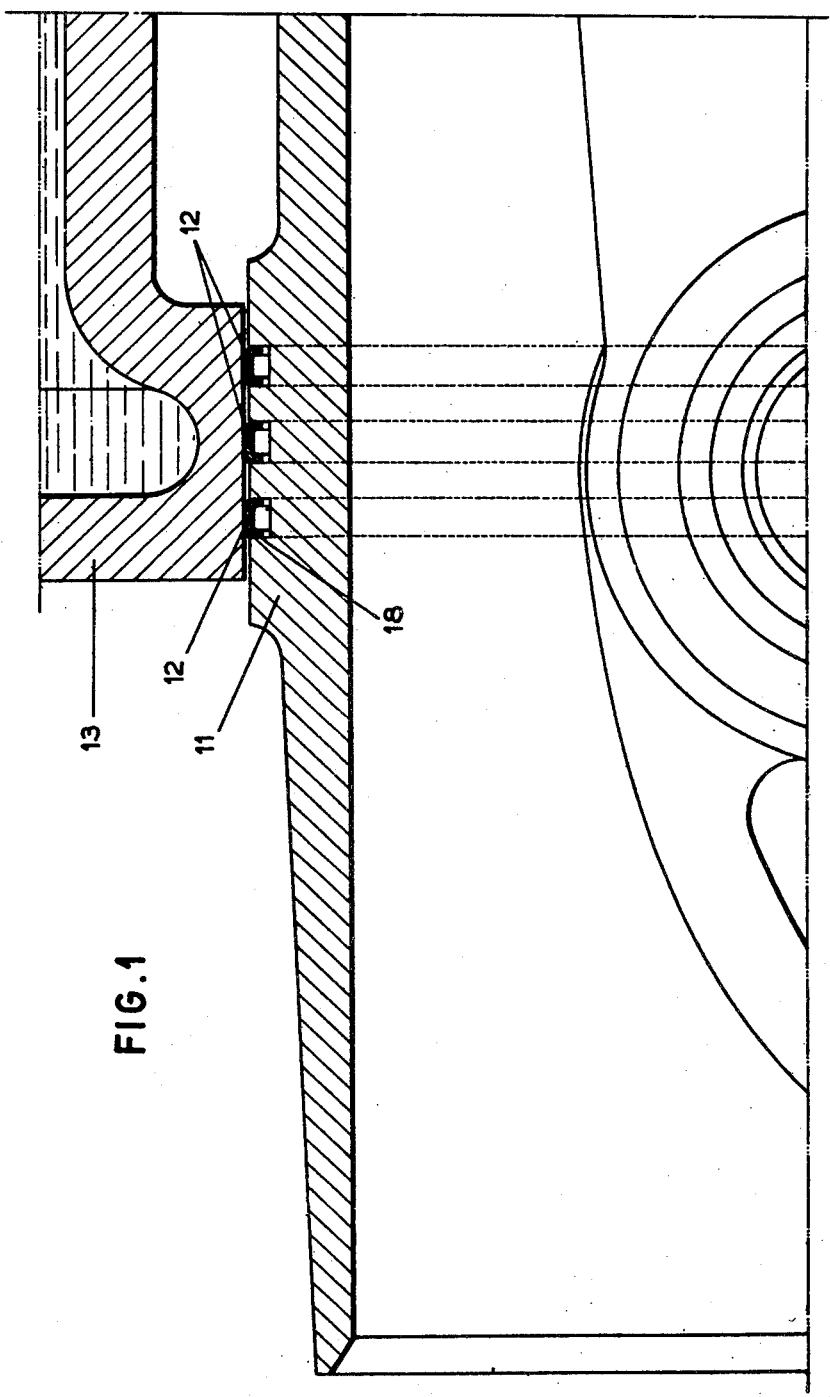
Fig. 1 is a partial cross-sectional view of the construction of a cylinder liner and cylinder block of an internal combustion engine provided with seal-rings according to my invention.

Referring first to Fig. 1, each cylinder liner 11 of the engine forms a liner member engageable within a block or housing 13, and tightly sealed in place through seal-rings 12 in such a way that said block together with said liner defines water-circulating chambers.

Figure 2:
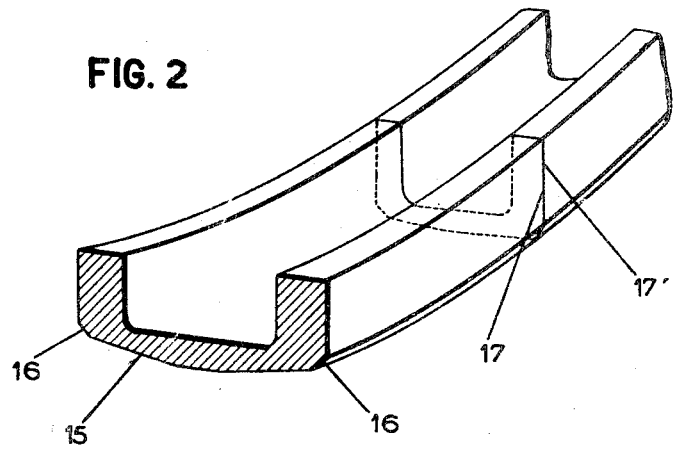
Fig. 2 is a partial perspective view of said seal-ring.
Figure 3:
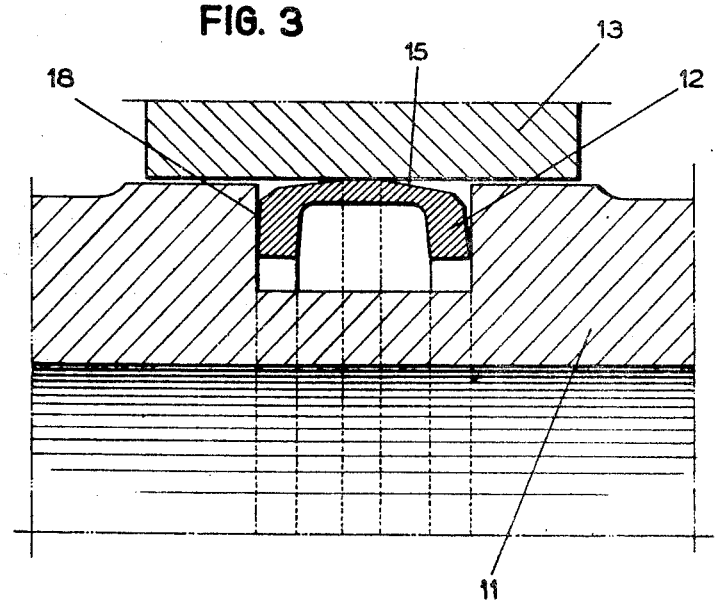
Fig. 3 is a partial transverse cross-section, at an enlarged scale, and shows how the seal-rings according to the invention is mounted between the cylinder liner and the cylinder block to connect tightly both parts together.

Fig. 2 is a perspective view of a seal-ring 12 taken near the point where both ends thereof are abutting against each other. Said seal-ring 12 has the shape of a U in cross section, both legs of the U projecting towards the center line of said ring; the outer periphery 15 of said seal-ring 12 is slightly convex as shown and is bevelled at 16 on either side thereof; the ends 17 and 17' of the seal-ring abut against each other as in common practice. It is to be noted however that in the abutment plane the outer faces of the legs must be made absolutely clean without any beard; also the outer edges of the free ends of said legs are to be kept sharp and clean, in order that the water-tightness of the joint be secured, as will be understood from the description of Fig. 3.

Turning now to this figure, the seal-ring 12 is shown as mounted in place between the cylinder liner 11 and the cylinder block or housing 13. Said seal-ring 12 is inserted in an annular groove 18 having parallel lateral sides, cut in the outer surface of the liner 11, said groove 18 having a width slightly greater than that of the seal-ring. The seal-ring 12 is inserted into said groove in a conventional manner, and its convex periphery projects therefrom and from the outer periphery of the liner 11. Then the liner is forced within the housing 13, that is within a bore in said housing having an internal diameter slightly lesser than the maximum outer diameter of the seal-ring 12, whereby said seal-ring is tightly applied against said housing bore.

Due to the convexity of the outer periphery of the seal-ring 12, the pressure exerted thereon by the cylinder housing 13 causes the legs of the seal-ring to move away from each other and causes the outer edges of the free ends of said legs to be tightly applied against the related lateral sides of the annular groove 18.

It is thus seen that it is essential that the said edges be perfectly clean without any beard of clearance, since said beard or clearance, if present, would prevent the legs to be closely applied against the lateral sides of the groove 18 along the entire length thereof, thus preventing the required tightness to be obtained.

It is to be clearly understood that the above described embodiment of my invention is to be considered as illustrative only, and that numerous changes in the shape, size and arrangement of parts could be provided without departing from the spirit of my invention which I do not intend to limit more than comprised within the scope of the appended claims.

What I claim is:

1. An improved arrangement for tightly mounting a cylinder liner in a cylinder block, comprising in combination a cylinder liner provided with a number of annular grooves cut in the outer periphery thereof, the lateral sides of said grooves being perpendicular to the longitudinal axis of said liner; a cylinder block provided with a bore whose diameter is greater than the outer diameter of said liner; and seal-rings adapted to be inserted in said annular grooves, said seal-rings being of U-shaped cross-section with the legs of the U extending towards the centre line of said rings, the outer periphery of said rings being convex in cross-section and having a maximum diameter greater than said inner diameter of said bore in said cylinder block when their ends are in abutting relation; the transverse width of said rings being less than the spacing between opposite sides of said related grooves whereby when said liner is inserted in said cylinder block the legs of said rings bear against the lateral sides of said grooves.

2. A method for tightly mounting an inner member within an outer member, the outer peripheral surface of said inner member and the inner peripheral surface of said outer member being cylindrical surfaces of revolution, which surfaces ultimately face each other in a fixed relative position in the finished arrangement, comprising providing a number of annular grooves in one of said ultimately facing cylindrical surfaces having their side walls substantially perpendicular to the longitudinal axis of said member, placing and maintaining seal-rings having a U-shape cross-section with a convex outer peripheral portion, said seal-rings having a transverse width less than the spacing between opposite sides of said grooves and the diameter of said seal-rings with their ends abutting one another is slightly greater than the diameter of said ungrooved cylindrical surface, respectively, in front of said grooves ready for insertion of the free ends of the legs of said U between said opposite sides, placing both members in substantially coaxial relation, and causing a coaxial relative displacement of said grooved and ungrooved cylindrical surfaces with said seal-ring therebetween, then forcing said cylindrical surfaces into opposite relation, whereby the said rings enter deeper into said grooves, the U-shaped section being so deformed that the outer lateral faces of said U-legs bear against the said opposite sides of said grooves.

3. A method according to claim 2, which utilizes seal-rings, the free end faces of which are matingly machined to constitute perfectly sealing cooperating surfaces when in place.

4. An improved arrangement for tightly mounting an inner member within an outer member, the outer peripheral surface of said inner member and the inner peripheral surface of said outer member being cylindrical surfaces of revolution, which outer and inner surfaces ultimately face each other in a fixed relative position in the finished arrangement, comprising in combination, one of said members being provided with a number of annular grooves in one of said cylindrical surfaces having their side walls substantially perpendicular to the longitudinal axis of said members, a number of seal-rings equal in quantity to said grooves, said seal-rings being of U-shaped cross-section with the legs of each U being adapted to be inserted between the side walls of said grooves and in the direction of the bottom thereof, respectively, the outer periphery of the outwardly projecting web of said ring being convex in cross-section and having a maximum diameter greater than said inner peripheral surface of said outer member when the ends of said ring are in abutting relation.

5. Means for making a tight joint between two members to be maintained in stationary relationship, comprising a U-shaped radially split seal-ring member having a convex outer surface, said seal-ring member inserted in a peripheral recess in one of the said members with the legs of the U extending inwardly wherein the width of the recess is slightly greater than the width of the U-shaped ring and wherein the diameter of the ring with its ends abutting one another is slightly greater than the diameter of the other part, whereby when the one member is being inserted within the other member the legs of the U are forced apart and bear tightly against the lateral sides of the recess.

6. Means as in claim 5 wherein the two members are a cylinder housing member and a cylinder liner member therefor.

ROLAND LARAQUE.

References Cited in the file of this patent

UNITED STATES PATENTS

| Number | Name | Date |
|---|---|---|
| 1,082,172 | Rich | Dec. 23, 1913 |
| 1,741,436 | Raule | Dec. 31, 1929 |
| 1,778,924 | Teetor | Oct. 21, 1930 |
| 1,824,528 | Bailey | Sept. 22, 1931 |
| 2,127,825 | Mader | Apr. 23, 1938 |

FOREIGN PATENTS

| Number | Country | Date |
|---|---|---|
| 2,382 | Great Britain | Jan. 31, 1906 |
| 126,330 | Great Britain | May 15, 1919 |
| 212,617 | Great Britain | Mar. 10, 1944 |
| 221,795 | Great Britain | Feb. 12, 1925 |
| 623,601 | France | Mar. 21, 1927 |
| 855,790 | France | Feb. 26, 1940 |